United States Patent Office 3,440,491
Patented Apr. 22, 1969

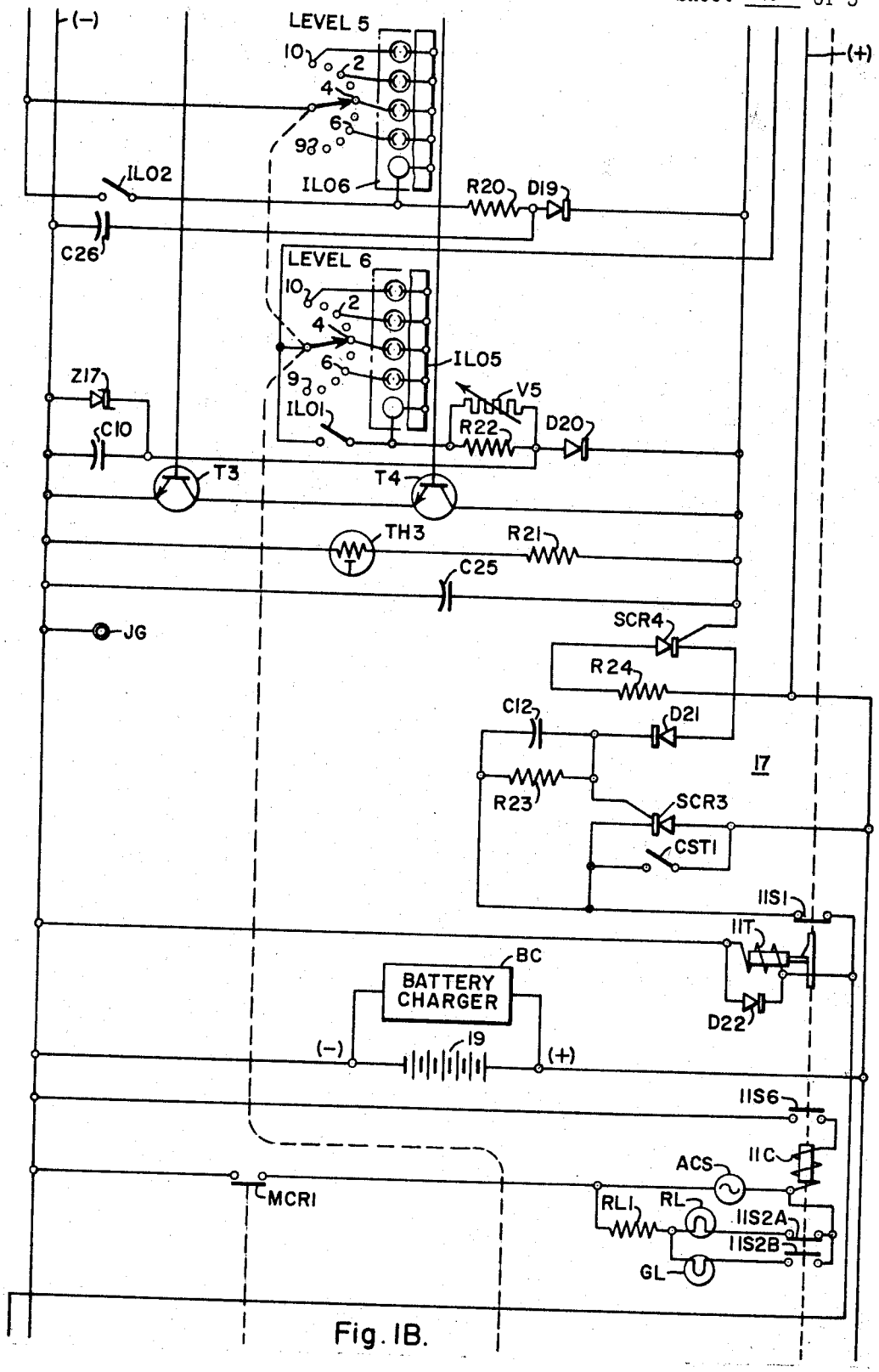
Fig. IB.

3,440,491
CIRCUIT-CONTROLLING SYSTEMS
Nathaniel D. Tenenbaum, Middlesex, and Gino J. Marieni, Parsippany, N.J., assignors to Westinghouse Electric Corporation, East Pittsburgh, Pa., a corporation of Pennsylvania
Filed June 5, 1962, Ser. No. 200,129
Int. Cl. H02h 5/00
U.S. Cl. 317—22　　　　　　　　　　　　　17 Claims

ABSTRACT OF THE DISCLOSURE

This disclosure relates to a static type reclosing circuit breaker operator in which a stepping switch is actuated upon each opening operation to time the interval between opening and reclosing, means is provided to prevent further reclosing after a desired number of openings, and means is provided to reset the operator at the end of a predetermined time interval after any closure of the breaker when the breaker remains closed.

---

This invention relates to circuit-controlling systems and has particular relation to reclosing circuit breakers.

In accordance with the invention, an improved control is provided for governing the tripping and reclosing of a circuit breaker. The tripping of the circuit breaker is determined by a static array of components which respond to the line or zero-sequence currents in a protected line section and which may be adjusted to provide any of a number of time-delay characteristics.

When a fault occurs on the protected line section the control trips and recloses the circuit breaker in a predetermined pattern which for a permanent fault may trip and reclose the circuit breaker a preselected adjustable number of times and then lock out the circuit breaker in an open condition.

In a preferred embodiment of the invention, each of the reclosures may occur instantaneously or a substantial time after the immediately preceding tripping operation is determined by a static timer. The pattern of successive reclosures and lockout is determined by a stepping device which is advanced in response to an operation of the circuit breaker.

If the circuit breaker remains closed for a predetermined time following a reclosure thereof, a static timer operates to reset the control.

It is therefore an object of the invention to provide an improved control for governing the tripping and reclosing of a circuit breaker.

It is also an object of the invention to provide an improved control having static components and having adjustable time-delay characteristics for governing tripping of a circuit breaker.

It is another object of the invention to provide an improved reclosing circuit-breaker.

It is a further object of the invention to provide a reclosing control for a circuit breaker which includes a static reclosing timer having a number of available time delays.

It is an additional object of the invention to provide a resetting control for a reclosing circuit breaker which includes a static reset timer.

Figure 1A:
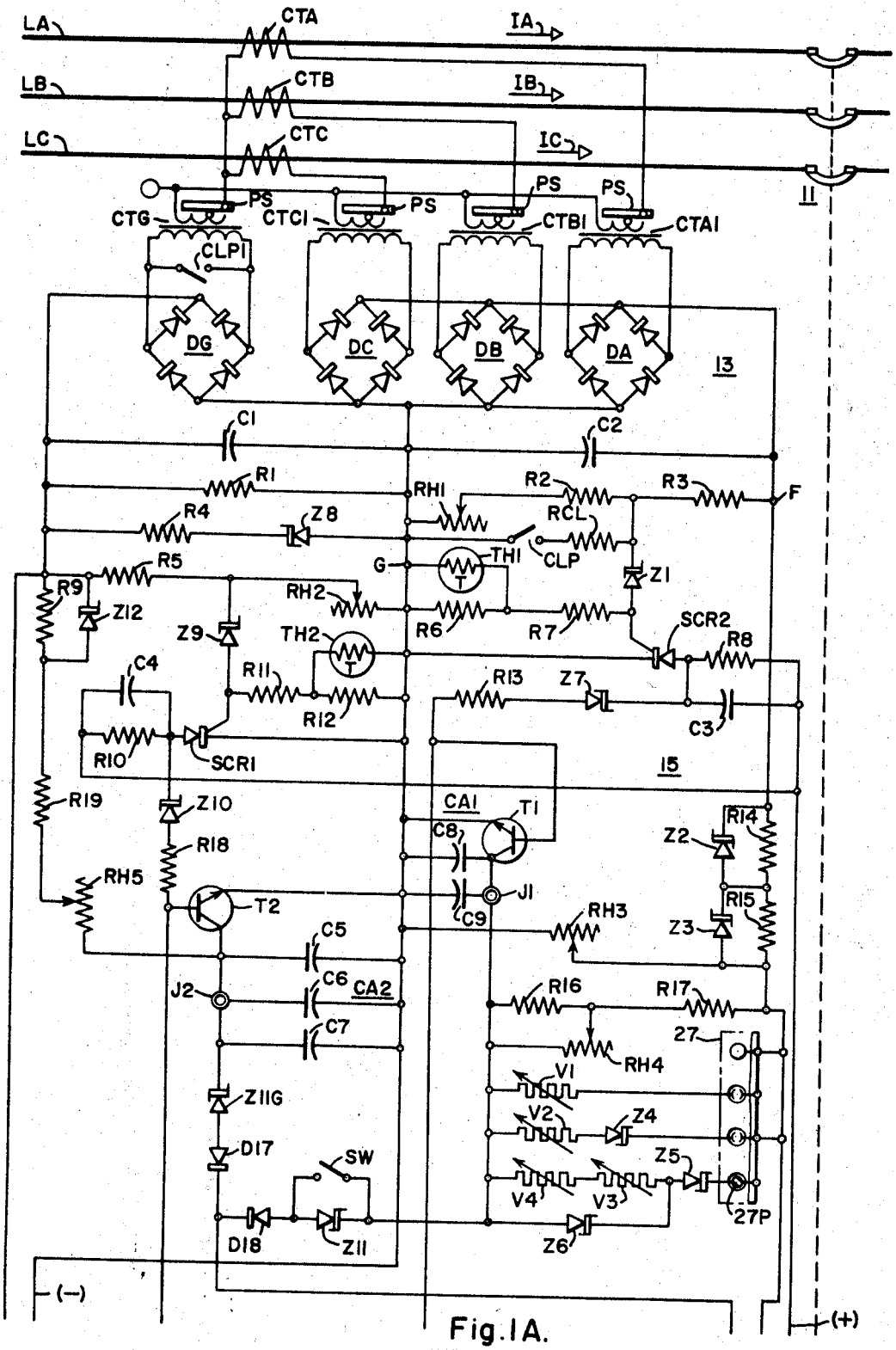
Figure 1C:
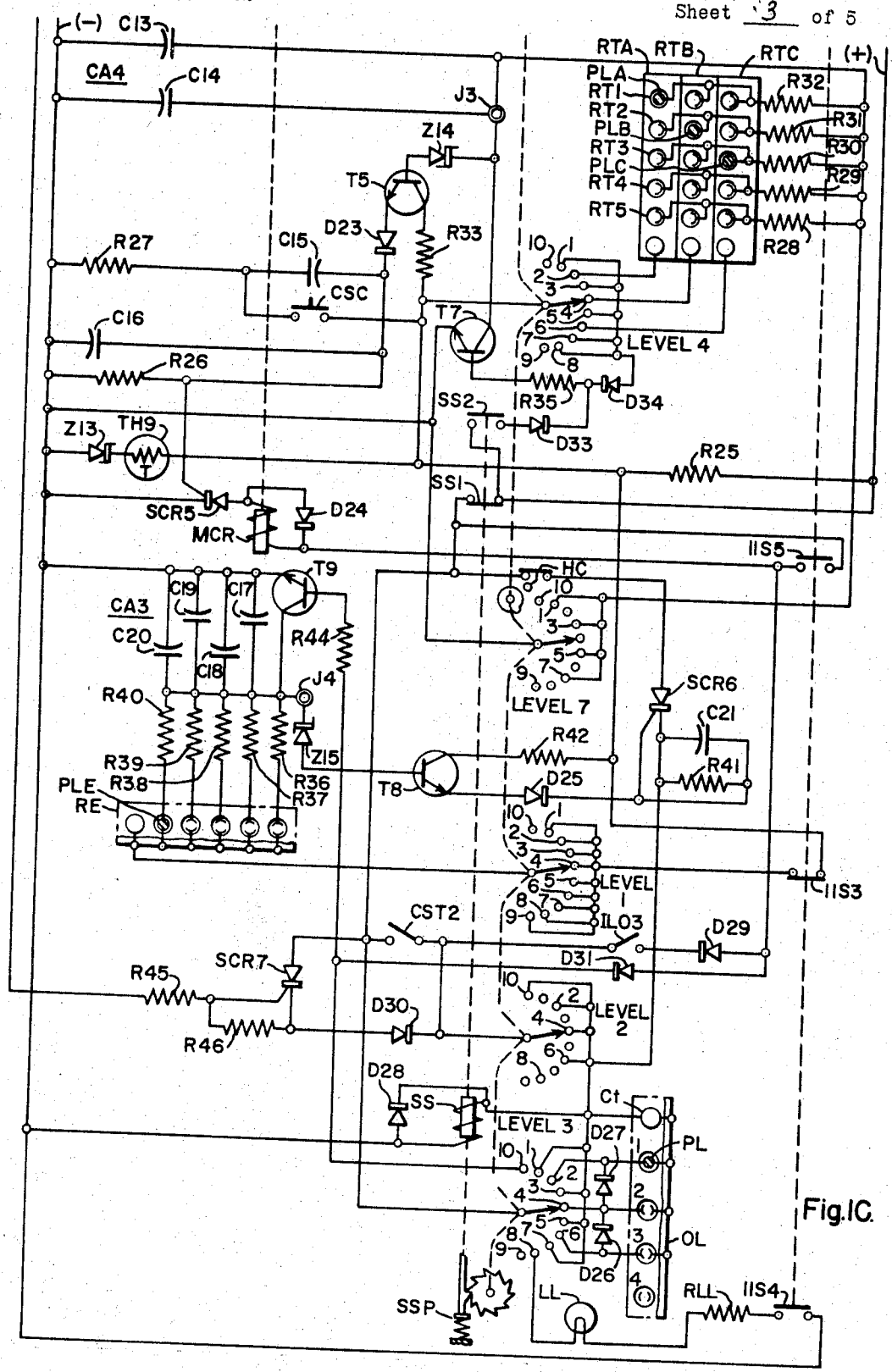
Figure 2:
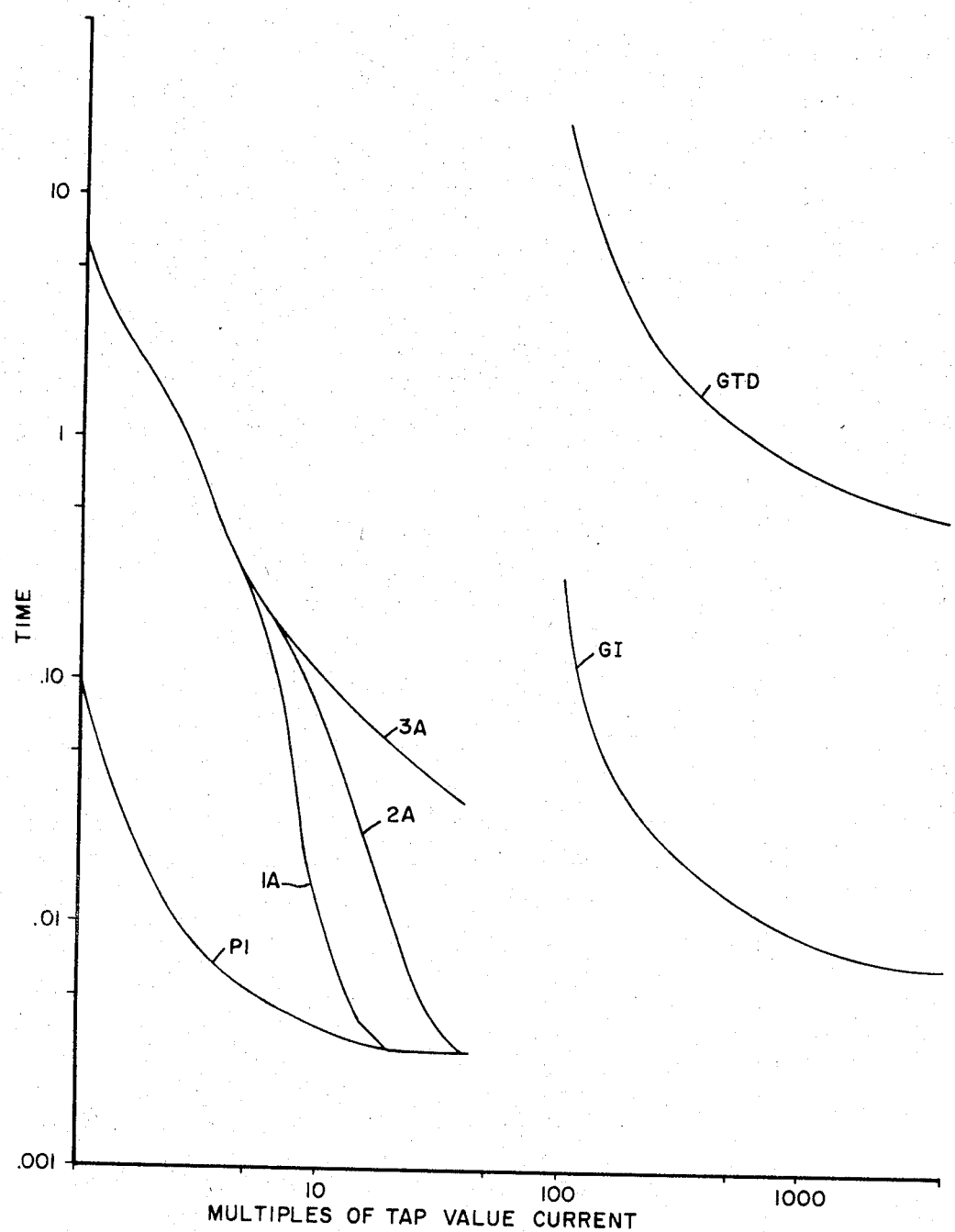
Figure 3:
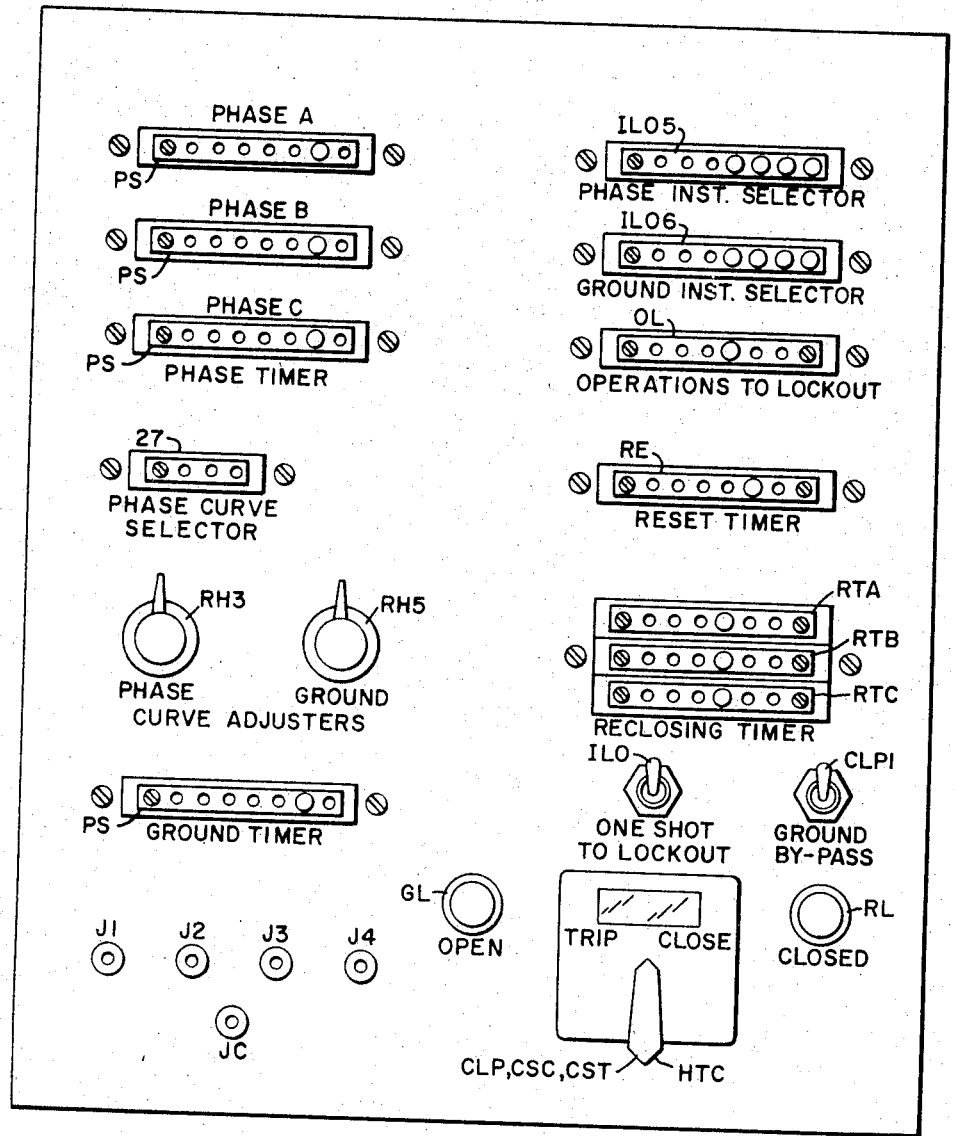

Other objects of the invention will be apparent from the following description taken in conjunction with the accompanying drawings, in which:

FIGURES 1A, 1B and 1C, collectively, represent a schematic view of an electric system embodying the invention (FIG. 1B should be placed below FIG. 1A and FIG. 1C should be placed below FIG. 1B);

FIG. 2 is a graphical representation showing certain time and current relationships which are useful in explaining the invention; and FIG. 3 is a view in front elevation of a control panel suitable for the system of FIG. 1.

FIGURES 1A, 1B and 1C show a reclosing-circuit breaker combination which is associated with an electric system to be protected. This system may be of any type having a condition to which the combination is to respond. For present purposes it will be assumed that the system is a three-phase system operating at a power frequency of 60 cycles per second and represented by three phase or line conductors LA, LB and LC. These line conductors transmit alternating currents IA, IB and IC, respectively, from a suitable source to a load through a circuit breaker 11 having a closing motor 11C and a trip coil 11T. The circuit breaker has three auxiliary switches 11S1, 11S2A and 11S3 which are open when the circuit breaker is in open condition and which are closed when the circuit breaker is in closed condition. The circuit breaker 11 is shown in its closed condition.

The circuit breaker has four auxiliary switches 11S2B, 11S4, 11S5 and 11S6. These switches are closed when the circuit breaker is in open condition and are open when the circuit breaker is in closed condition.

The reclosing-circuit-breaker combination is designed to respond to a suitable condition of the electric system which is to be protected. In a preferred embodiment of the invention the combination comprises an overcurrent relay assembly which responds to currents flowing through the line conductors.

The relay assembly includes a converter unit 13 which derives from the phase currents IA, IB and IC a direct voltage which is applied between points F and G and which is dependent on the largest of the three line currents. This direct voltage is applied to a timing unit 15 for the purpose of controlling the charging of a capacitor unit CA1 which may include one or more capacitors, in the illustrated case capacitors C8 and C9. When the voltage across the capacitor unit CA1 exceeds a predetermined value a signal is applied to a tripping unit 17 for the purpose of initiating a tripping operation of the circuit breaker 11.

By inspection of FIGURE 1A it will be noted that three current transformers CTA, CTB and CTC have primary windings energized in accordance with the line currents LA, LB and LC, respectively. The secondary windings of the current transformers CTA, CTB and CTC are respectively connected to the primary windings of transformers CTA1, CTB1 and CTC1 located in the converter unit 13. Preferably the primary windings of the current transformers CTA1, CTB1 and CTC1 have adjustable numbers of turns selected by suitable plug and socket assemblies PS to facilitate adjustment of the relay assembly.

The secondary windings of the transformer CTA1, CTB1 and CTC1 are connected to the input terminals of rectifiers DA, DB and DC respectively. The rectifiers may be of any desired construction. Preferably, they are full-wave rectifiers and are illustrated as rectifiers of the bridge type in FIGURE 1A.

The output terminals of the rectifiers are connected in parallel across a voltage divider represented by three resistors R3, R2 and RH1. For the purpose of calibration at least one of these resistors, such as the resistor RH1, preferably is adjustable. A filter capacitor C2 is connected across the output terminals of the rectifiers for the purpose of removing ripple from the output and assuring the supply of a ripple-free direct voltage across the voltage divider. The parallel connection of the rectifier outputs results in a voltage across the voltage divider corresponding to the largest of the three input voltages to the rectifiers.

In the timing unit 15 the direct voltage appearing across the voltage divider is employed for charging a storage device such as the capacitor unit CA1. This direct voltage is applied across an adjustable resistor RH3 through resistors R14 and R15, and is applied across the capacitor unit CA1 through the resistor R17 and through the parallel resistors R16 and RH4. At least one of the resistors R16 and RH4 preferably is adjustable to facilitate calibration. Thus, adjustment of the resistor RH4 adjusts the rate of charge of the capacitor unit CA1 and the time required for the capacitor to reach a predetermined terminal voltage. The time also may be adjusted by adjustment of the capacitance of the capacitor unit CA1.

For small values of the line currents the capacitor unit CA1 is shunted by a suitable switch which preferably takes the form of the output circuit of a transistor T1. Atlhough the circuits may be arranged for a transistor of the PNP type, it will be assumed that the transistor T1 is an NPN type transistor. As shown in FIGURE 1A, the collector of the transistor T1 is connected to the right-hand terminal of the capacitor unit CA1 whereas the emitter of the transistor is connected to the left-hand terminal of the capacitor unit.

For small values of line current sufficient current is transmitted through the input or control circuit of the transistor T1 to place the transistor in conductive condition and thus to assure maintenance of the capacitor unit CA1 in a discharged condition. The input or control circuit for the transistor may be traced from the positive terminal having a positive polarity marking (+) of a source of direct voltage 19 (FIGURE 1B) through a resistor R8 (FIGURE 1A), a minimum voltage or threshold device such as a Zener diode Z7, a resistor R13, the base of the transistor T1, and the emitter of the transistor to the negative terminal of the source of direct voltage 19 represented by a negative polarity marking (—). A 24 volt battery may be employed as the source 19.

When the capacitor unit CA1 is to start a timing operation, a switch is closed to shunt the input or control circuit of the transistor T1. This turns the transistor T1 off and permits the capacitor unit CA1 to charge. The shunting of the transistor preferably is by a silicon-controlled rectifier SCR2. This controlled rectifier has its anode connected to a point intermediate the resistor R8 and the Zener diode Z7. The controlled rectifier has a cathode connected to the emitter of the transistor T1. The gate of the controlled rectifier is connected to a point intermediate the resistors R2 and R3 through a minimum voltage or threshold device Z1.

For low values of voltage thereacross, the minimum voltage device Z1 is in effect an insulator and blocks the flow of current therethrough. When the voltage thereacross rises above a predetermined value the device Z1 breaks down to exhibit a relatively low resistance to the flow of current. When the voltage thereacross drops below the predetermined value, the device Z1 recovers its insulating properties. In a preferred embodiment of the invention, this device takes the form of a Zener diode. Resistors R6 and R7 are connected in series between the gate and cathode of the controlled rectifier SCR2. A capacitor C3 is connected across the resistor R8 and the values of the components are selected to enable the silicon-controlled rectifier to turn off and on depending on the signal at the gate of the controlled rectifier. To indicate suitable parameters, the controlled rectifier is designed for an output current of the order of 200 milliamperes. The resistor R8 has a resistance of 27,000 ohms and the capacitor C3 has a substantial capacitance such as 47 microfarads.

The operation of the timing unit now will be briefly reviewed. It will be assumed that the values of line currents flowing are too small to result in turn on of the controlled rectifier SCR2. Because of the current flowing from the positive terminal of the source 19 through the resistor R8, the Zener diode Z7, the resistor R13, the base and emitter of the transistor T1 to the negative terminal of the source of direct voltage, the transistor T1 is turned on and establishes a low-resistance path across the capacitor unit CA1. Consequently, the capacitor unit CA1 is in discharged condition.

It will be assumed next that the line current IA increases until it reaches fault values. As the current increases, a stage is reached at which the voltage across the Zener diode Z1 breaks down the diode and current flows from an intermediate terminal of the voltage divider through the Zener diode Z1 and the resistors R7 and R6 back to the left-hand terminal of the voltage divider. The voltage drop across the resistor R7 and R6 turns on the controlled rectifier SCR2 and current now flows from the positive terminal of the source of direct voltage through the resistor R8, and the anode and cathode of the controlled rectifier to the negative terminal of the source of direct voltage.

Because of the low voltage now appearing between the anode and cathode of the controlled rectifier SCR2, the voltage across the Zener diode Z7 drops below the value required to maintain conduction therethrough and the current flowing through the base-emitter circuit of the transistor T1 drops to turn off the transistor. Since the transistor T1 now represents a high resistance across the capacitor unit CA1 this capacitor unit starts to charge.

The voltage across the capacitor unit increases until a minimum voltage device Z11 breaks down. This minimum voltage device may be similar in construction to the device Z1. When the device Z11 breaks down the timing unit 15 delivers an input to the tripping unit 17 through a rectifier D18.

If the sharp-breakdown point of the device Z11 is not desired, the device may be, and in a preferred embodiment is, shunted by a manually-operated switch SW.

Let it be assumed now that the line current IA starts to drop either after or before the capacitor unit CA1 is charged sufficiently to result in break down of the device Z11. When the line current drops to a predetermined value, the Zener diode Z1 is restored to its blocking condition and the controlled rectifier SCR2 turns off.

Inasmuch as the controlled rectifier SCR2 is in blocking condition sufficient current flows from the positive terminal of the battery 19 through the circuit represented by the resistor R8, the Zener diode Z7 the resistor R13 and the base and emitter of the transistor T1 to turn on the transistor. The transistor now establishes a low-resistance shunt across the capacitor unit CA1 and the capacitor unit CA1 is rapidly discharged through the transistor. This completes a cycle of operation of the timing unit 15.

When the timing unit 15 delivers an input to the tripping unit 17 (FIG. 1B) the tripping unit trips the circuit breaker 11. This tripping unit is energized from a source of direct voltage such as the battery 19.

The trip coil 11T of the circuit breaker 11 is connected across the source of direct voltage 19 through the auxiliary switch 11S1 and a control switch SCR3 which is closed when the circuit breaker is to be tripped. Preferably the switch SCR3 is a silicon-controlled rectifier similar to the controlled rectifier SCR2. The output circuit of the controlled rectifier SCR3 may be traced from the positive terminal (+) of the source of direct voltage 19 through the anode and cathode of the controlled rectifier SCR3, the auxiliary switch 11S1 and the trip coil 11T to the negative terminal (—) of the source of direct voltage. A resistor R23 and a capacitor C12 are connected in parallel across the gate and cathode of the controlled rectifier.

When the controlled rectifier SCR3 is to be fired a switch SCR4 is closed which connects the positive terminal of the battery 19 through a resistor R24, the anode and cathode of the controlled rectifier SCR4, a rectifier D21, the resistor R23, the auxiliary switch 11S1 and the trip coil 11T to the negative terminal of the battery. Sufficient current passes through this circuit to produce a voltage across the resistor R23 which fires the controlled rectifier SCR3 and this controlled rectifier connects the trip coil 11T across the source of direct voltage through the auxiliary switch 11S1 to assure tripping of the circuit breaker. The capacitor C12 establishes a bypass circuit for alternating current components across the resistor R23.

Preferably the switch SCR4 takes the form of a silicon-controlled rectifier similar to the controlled rectifier SCR2. As shown in FIG. 1B, the anode of the controlled rectifier SCR4 is connected through the resistor R24 to the positive terminal of the battery 19 whereas the cathode is connected to the rectifier D21. The gate of the controlled rectifier SCR4 is connected through resistors R21 and TH3 to the negative terminal of the battery 19.

The capacitor C25 assures a slight time delay in the firing of the controlled rectifier SCR4. This prevents firing of the controlled rectifier by a brief transient.

Two transistors T3 and T4 have their collectors and emitters connected in series across the capacitor C25. The base of the transistor T4 is connected to the base of the transistor T1. Consequently, when the transistor T1 turns on to discharge the capacitor unit CA1 the transistor T4 turns on to discharge the capacitor C25 (assuming that the transistor T3 is turned on).

When the transistor T1 turns off to permit a timing operation, the transistor T4 also turns off to place the capacitor C25 associated with the controlled rectifier SCR4 in effective charging condition. When the Zener diode Z11 breaks down the capacitor C25 charges and current flows from the capacitor unit CA1 through the resistors R21 and TH3. The voltage drop across these resistors supplies an input or control current to the silicon-controlled rectifier SCR4 through a circuit which may be traced from the right-hand terminal of the resistor R21 through the gate and cathode of the controlled rectifier SCR4, the rectifier D21, the resistor R23, the auxiliary switch 11S1 and the trip coil 11T to the left-hand terminal of the resistor TH3. Although this current may be insufficient to operate the controlled rectifier SCR3 or to trip the circuit breaker it suffices to turn on the controlled rectifier SCR4 and this assures firing of the controlled rectifier SCR3 in the manner previously discussed.

In opening, the circuit breaker 11 interrupts the flow of line current. Consequently, the voltage across the voltage divider R3, R2 and RH1 drops to zero. This turns off the controlled rectifier SCR2. Inasmuch as the controlled rectifier SCR2 is turned off sufficient current now flows through the emitters of the transistors T1 and T4 to turn on the transistors. The transistors promptly discharge the capacitor unit CA1 and the capacitor C25 (assuming that the transistor T3 is conducting).

As a result of the opening of the switch 11S1 of the circuit breaker 11, the currents flowing through the output circuits of the controlled rectifiers SCR3 and SCR4 drop and the gates of these controlled rectifiers regain control. The controlled rectifiers SCR3 and SCR4 return to their off conditions.

In relay design it is desirable to match certain curves or to provide a predetermined relation between certain variable quantities such as the relation between the line current and the output of the timing unit. For example, such matching is desirable in order to insure proper co-ordination among relays employed for protecting an electrical system.

It will be recalled that the tripping of the circuit breaker 11 in response to a line current above minimum tripping value takes place with a substantial time delay which is determined by the capacitor unit CA1 and its associated charging circuit primarily. The time delay is of the inverse time type which varies in magnitude as an inverse function of the magnitude of the line current responsible for the tripping operation. Such characteristics are desirable to assure proper coordination with other time-delayed protective equipment such as fuses.

Characteristic time-delay curves available in the system of FIGS. 1A, 1B and 1C are shown in FIG. 2 wherein abscissas represent multiples of the minimum fault current necessary to produce a tripping operation and ordinates represent time delay in tripping. FIG. 2 is based on the assumption that the switch SW is closed to shunt the Zener diode Z11 (FIG. 1A).

The curves of FIG. 2 represent time delays in the application of a tripping energization to the trip coil 11T. They do not include the time delays required for the circuit breaker to open following energization of the trip coil.

FIG. 2 shows three curves 1A, 2A and 3A which have a common portion over the range of 100 to 400% of minimum pickup current required to produce a tripping operation of the circuit breaker. The components of FIGS. 1A, 1B and 1C which produce the characteristic curves 1A, 2A and 3A now will be considered.

The common portion of the three curves is shaped in part by minimum voltage devices Z2 and Z3 which are connected respectively to shunt the resistors R14 and R15. The minimum voltage devices preferably are Zener diodes.

As a charging current for the capacitor unit CA1 increases, a point is reached at which the voltage across the resistor R14 exceeds the breakdown voltage for the Zener diode Z2. For larger values of charging current, the resistor R14 consequently has no effect on the shaping of the characteristic curve.

As the charging current continues to increase, a point is reached at which the voltage across the resistor R15 exceeds the breakdown voltage for the Zener diode Z3. For larger values of charging current, the resistors R14 and R15 have no effect on the shape of the characteristic curve.

The three curves 1A, 2A and 3A are produced respectively by the three conditions, 1, 2, and 3 of a curve selector 27. The curve selector is in the form of a tap block or conductive plate connected to the right-hand terminal of the resistor R17 and having three connection screw sockets 1, 2 and 3 for reception of a connection plug 27P. In its position 1, the plug 27P of the curve selector connects a minimum voltage device Z5 and two varistors V3 and V4 in series across the resistor R17 and the parallel resistors R16 and RH4. In addition, a minimum voltage device Z6 is connected across the varistors V3 and V4. These minimum voltage devices desirably are Zener diodes.

As the charging current for the capacitor unit CA1 increases above the value corresponding to 400% of minimum trip value, the voltage across the Zener diode Z5 reaches a value sufficient to break down the diode. At this point, the varistors V3 and V4 are effectively connected in parallel with the resistor array comprising the resistor R17 and the parallel resistors R16 and RH4. A varistor is a well known non-linear resistor which has a resistance value that varies as an inverse function of the current therethrough.

As the charging current continues to increase, a point is reached at which the voltage across the Zener diode Z6 is sufficient to break down the diode. For larger values of charging current, the varistors V3 and V4 do not affect the shaping of the characteristic curve.

Let it be assumed next that the curve selector plug is inserted in its position 2 wherein a minimum voltage device Z4 such as a Zener diode and a varistor V2 are connected in series across the resistor R17 and the parallel resistors R16 and RH4 to produce the characteristic curve 2A of FIG. 2.

As the charging current for the capacitor unit CA1 increases above the value corresponding to 400% of minimum tap value current, a point is reached at which the Zener diode Z4 breaks down. For larger values of charging current, the varistor V2 is effective for modifying the shape of the characteristic curve and produces the shape shown by the curve 2A of FIG. 2. The reverse bending of the curves 1A and 2A for larger values of currents is a desirable feature for recloser operation.

When the curve selector plug 27P is operated to its position 3, a varistor V1 is connected in shunt with the resistor R17 and the parallel resistors R16 and RH4 to produce a characteristic similar to the curve 3A of FIG. 2.

Adjustment of the adjustable resistor RH4 results in adjustment of each of the curves 1A, 2A and 3A of FIG. 2 in a vertical direction.

A further control of curve shapes is provided by the connection of a capacitor C10 (FIG. 1B) and a Zener diode Z17 in parallel between the negative terminal of the battery 19 and a point intermediate the rectifier D20 and the resistor 22.

When the voltage across the capacitor C10 exceeds a predetermined value the Zener diode Z17 breaks over to limit the voltage applied to the gate of the controlled rectifier SCR4.

In certain cases, it is desirable to provide a rapid tripping operation of the circuit breaker 11. A suitable characteristic curve for such cases is shown by the curve P1 in FIG. 2. For present purposes, it will be assumed that such rapid operation is provided by closure of a manually-operated switch IL01 (FIG. 1B). When this switch is closed, the voltage across the resistor RH3 is applied across the resistors R21 and TH3 through a varistor V5 and a resistor R22 in parallel and through the rectifier D20. This, in effect, bypasses the capacitor unit CA1 and thus permits a rapid tripping operation when the voltage across the resistors R21 and TH3 is sufficient to fire the silicon-controlled rectifier SCR4. For a fault current, the transistor T4 is turned off in the manner previously described to permit a firing operation of the silicon-controlled rectifier SCR4.

For some applications, it is desirable to provide a tripping operation of the circuit breaker 11 in response to line current or zero-sequence current flowing in the protected polyphase system. In the specific embodiment of FIG. 1, a transformer CTG has its adjustable primary winding connected in the residual circuit of the current transformers CTA, CTB and CTC for energization in accordance with the zero-sequence current of the protected system. The secondary winding of the transformer CTG is connected across the input terminals of a full-wave rectifier DG which is assumed to be of the bridge type. The output voltage of the rectifier is applied across a resistor R1 and is filtered by a capacitor C1. The same voltage appears across a resistor R4 and a minimum voltage or threshold device Z8 in series and across a voltage divider comprising the resistors R5 and RH2 in series. The minimum voltage device Z8 may be a Zener diode. The resistor RH2 is shown to be adjustable. As the voltage output of the rectifier DG increases, a point is reached at which the minimum voltage device Z8 breaks down to render the resistor R4 effective for loading the rectifier.

The voltage output of the voltage rectifier DG is applied across a capacitor unit CA2 through resistors R9, R19 and RH5. The capacitor unit may include one or more capacitors, three capacitors C5, C6 and C7 being shown in parallel in FIG. 1A. The resistor RH5 has an adjustable resistance.

It will be noted that a minimum-voltage or threshold device which preferably is a Zener diode Z12 is connected across the resistor R9. As the current through the resistor increases, the voltage across a resistor reaches a value sufficient to break down the Zener diode. Thus, for larger values of current the resistor R9 has no effect on the charging characteristics.

For low values of zero-sequence current, the capacitor unit CA2 is maintained in a discharged condition by a suitable controlled switch such as a transistor T2. The transistor T2 has its output circuit connected across the capacitor unit CA2. A current sufficient to maintain the transistor T2 turned on is supplied to the input circuit of the transistor through a circuit which may be traced from the positive terminal of the source of direct voltage 19 through a resistor R10, a Zener diode Z10, a resistor R18 and the base and emitter of the transistor T2 to the negative terminal of the source.

When the capacitor unit CA2 is to start a timing operation, a switch is closed to shunt the input or control circuit of the transistor T2. This turns the transistor T2 off and permits the capacitor unit CA2 to charge. The shunting of the transistor preferably is by a silicon-controlled rectifier SCR1. This controlled rectifier has its anode connected to a point intermediate the resistor R10 and the Zener diode Z10. The controlled rectifier has a cathode connected to the emitter of the transistor T2. The gate of the controlled rectifier is connected to a point intermediate the resistors RH2 and R5 through a minimum-voltage or threshold device such as a Zener diode Z9. Resistors R11 and R12 are connected between the gate and cathode of the controlled rectifier SCR2. To facilitate turn off of the controlled rectifier, a capacitor C4 is connected across the resistor R10.

A transistor T2 and the silicon-controlled rectifier SCR1 cooperate to control the charge and discharge of the capacitor unit CA2 in a manner which will be understood from the discussion of the control of the charge and discharge of the capacitor unit CA1 by the transistor T1 and the controlled rectifier SCR2. Although shaping components similar to those employed with the capacitor unit CA1 may be associated with the capacitor unit CA2 a less complicated shaping control suffices for the capacitor unit CA2. Thus, in FIG. 2, the curve GTD represents a suitable characteristic curve for the charging of the capacitor unit CA2. The components of FIG. 1 which thus far have been described suffice to produce such a curve.

The voltage across the capacitor unit CA2 is applied across the resistors R21 and TH3 through a minimum voltage or threshold device, such as a Zener diode Z11G, and a rectifier D17. As this voltage increases a value is reached at which the Zener diode breaks down to supply current to the resistors R21 and TH3.

The base of the transistor T3 is connected to the base of the transistor T2. Consequently, when the transistor T2 turns on to shunt the capacitor unit CA2, the transistor T3 also turns on to shunt the capacitor C25 (if the transistor T4 is in conducting condition). When the transistor T2 turns off to initiate a charging operation of the capacitor unit CA2, the transistor T3 also turns off to render effective the input circuit of the controlled rectifier SCR4.

If the system of FIGS. 1A, 1B and 1C is not to be employed in a substantially constant-temperature environment, compensation preferably is provided in certain circuits such as the gate circuits of the more critical controlled rectifiers for variation in properties due to temperature changes. Thus to compensate for the variation in response of the controlled rectifier SCR1 with temperature all or a substantial part of the resistance between the gate and cathode of the controlled rectifier may be replaced by a material having a negative temperature coefficient of resistance such as a thermistor. In the specific embodiment of FIG. 1A, a thermistor TH2 is connected across the resistor R12. For similar reasons, a thermistor TH1 is connected across the resistor R6 and the thermistor TH3 is connected in series with the resistor R21. Also, all or part of the resistor R16 may be replaced by a material having a negative temperature coefficient of resistance such as a thermistor.

It is sometimes desirable to provide a rapid tripping operation of the circuit breaker 11 in response to zero-sequence current. For example, a suitable characteristic curve GI is shown in FIG. 2. To illustrate equipment for producing such a characteristic curve, it will be assumed for present purposes that a manually-operated switch IL02 is in closed condition. This applies the output voltage of the rectifier DG across the resistors R21 and TH3 through a resistor R20 and a rectifier D19. As the voltage output of the rectifier DG increases, a value is reached at which the transistor T3 is turned off to render the input circuit for the controlled rectifier SCR4 effective. The circuit breaker 11 then trips in accordance with the curve GI of FIG. 2. A capacitor C26 is connected from the negative battery terminal to a point intermediate the resistor R20 and the rectifier D19 to provide a path for transient currents.

The pattern of tripping and closing operations of the circuit breaker 11 is determined by a stepping device or switch which may be of either static or electromechanical construction. In the specific embodiment of FIGS. 1A, 1B and 1C, the stepping switch is of electromechanical construction and includes an integrator coil SS, seven levels of contacts, a homing contact HC which is open only when the stepping switch is in a reset or home position, and two stepping contacts SS1 and SS2. Although the stepping switch may have any desired number of positions, it will be assumed that it has ten positions as shown in FIGS. 1B and 1C. In its reset or home condition the stepping switch occupies position 10 wherein the movable brush for each level engages the contact 10 for such level. The number 8 position of the stepping switch is the lockout position wherein each movable brush of a level engages the contact 8 for such level. For example, the brush for level 3 engages the associated contact 8 to complete an energizing circuit from the positive terminal of the battery 19 through the contacts SS1 of the stepping switch and the brush and contact member 8 of level 3 of the stepping switch, the lockout light LL, a resistor RLL, and the auxiliary switch 11S4 of the circuit breaker 11 to the negative terminal of the batery. The illumination of the lockout light LL indicates that the circuit breaker 11 is locked out and thus prevented from reclosing automatically.

A rectifier D22 is connected across the coil of the trip coil 11T in order to permit discharge of energy stored in this coil when the coil is deenergized.

For each brief energization of the trip coil 11T an electric pulse is delivered to the integrator coil SS for the purpose of stepping the stepping switch to the next position. It will be noted that a rectifier D28 is connected in a conventional manner across the integrator coil to permit discharge of energy stored in the coil after the coil is deenergized.

Let it be assumed that the stepping switch is in position 10 at the time the circuit breaker 11 trips. The energization of the trip coil 11T is accompanied by energization of the control circuit of a switch SCR7, which conveniently may be a silicon-controlled rectifier, through a circuit which may be traced from the positive terminal of the battery 19 through the anode and cathode of the controlled rectifier SCR3, the auxiliary switch 11S1, resistors R45 and R46, a rectifier D30, the brush and contact 10 of the second level, and the integrator coil SS to the negative terminal of the battery 19.

The voltage across the resistor R46 is applied between the gate and cathode of the controlled rectifier SCR7. The controlled rectifier fires to connect the coil SS across the battery 19 through the break contacts SS1 of the stepping switch, the anode and cathode of the controlled rectifier, the rectifier D30, and the brush and contact 10 of the second level. The energized coil SS lowers its armature as viewed in FIG. 1C to cock the spring SSP and to open its make contacts SS1. Upon opening, the contacts SS1 deenergize the coil SS and the spring SSP resets the armature to advance the stepping switch one position. The integrator coil SS now is energized through the contacts SS1 and the brush and contact 1 of level 3 to advance the stepping switch to its position 2. In this way the stepping switch automatically steps from each odd position to the next even position.

In position 2 of the stepping switch the brush engages contact 2 of the third level. A panel OL is provided with common terminal Ct and a number of openings 1, 2, 3 and 4. When a plug PL is in the opening 1, the contact 2 of the third level of the stepping switch is connected through the plug to the upper terminal of the integrator coil SS. In a similar manner, the plug may be inserted in openings 2 or 3 to connect contacts 4 or 6 of this level respectively to the upper terminal of the intergrator coil. The opening in which the plug is inserted determines the number of tripping operations permitted for the circuit breaker before the circuit breaker locks out. It will be noted that a rectifier D26 is connected between the contacts 4 and 6 and that a rectifier D27 is connected between the contacts 2 and 4 of the third level of the stepping switch.

As the stepping switch steps from position 1 to position 2, the contacts SS1 momentarily are opened. If the plug PL is located in opening 1 of the panel OL, the reclosure of the contacts SS1 reenergizes the integrator coil SS to step the stepping switch to position 3 again momentarily reopening the contacts SS1. The reclosure of the contacts SS1 steps the stepping switch to its position 4 in a manner which will be clear from the preceding discussion. The reclosure of the contacts SS1 as the stepping switch reaches its position 4 completes with the brush and contact 4 of the third level, the rectifier D27 and the plug PL a reenergizing circuit for the integrator coil SS and the stepping switch promptly steps to its position 5. Closure of the contacts SS1 steps the stepping switch to its position 6 by a sequence similar to that followed in stepping from position 1 to position 2.

When the brush reaches the contact member 6 of level 3 of the stepping switch, the reclosure of the contacts SS1 again completes an energizing circuit for the integrator coil through the brush and contact 4 of the third level, the rectifiers D26 and D27, and the plug PL. This steps the stepping switch to its position 7 from which the stepping switch automatically steps to position 8, the lockout position wherein the lockout light LL is illuminated. Thus, insertion of the plug PL in the opening 1 has limited the circuit breaker to one tripping operation before lockout. In an analogous manner, insertion of the plug in opening 2 or opening 3 of the panel OL restricts the circuit breaker to two or three tripping operations respectively before lockout.

The time delay in reclosure of the circuit breaker for each operation in which reclosure is called for is determined by a capacitor unit CA4 and its associated charging circuit. The capacitor unit CA4 includes one or more capacitors, and capacitors C13 and C14 are illustrated as connected in parallel to form the capacitor unit CA4.

The time delay introduced by the reclose timer depends on which of five resistors R32, R31, R30, R29, or R28 is selected for controlling the charging of the capacitor unit CA4. Inspection of FIG. 1C shows that the right hand terminal of each of the resistors is connected to the right-hand terminal of the capacitor unit CA4. The left hand terminals of the resistors are connected respectively to five connection screw sockets RT1, RT2, RT3, RT4 and RT5 located on each of three conductive reclose timer panels or tap blocks RTA, RTB and RTC. Each of the contacts 2, 4 and 6 of the fourth level of the stepping switch is connected to a separate one of the three panels RTA, RTB and RTC. Plugs PLA, PLB and PLC are associated respectively with the panels RTA, RTB and FTC for connecting each of the contacts 2, 4 and 6 to any of the resistors R28 to R32.

As representative of suitable parameters, the resistor R32 may have a small value of resistance to provide rapid reclosure and the resistors R31, R30, R29 and R28 may introduce time delays of the order of 2, 15, 30 or 45 seconds respectively. It will be noted that the brush of the fourth level of the stepping switch connects any contact of the level which it engages through a resistor R25 to the positive terminal of the battery 19.

When the brush engages any of the contacts 1, 3, 5, 7 or 8 of the fourth level of the stepping switch the transistor T7 is turned on to assure complete discharge of the capacitor unit CA4. For example, when the brush engages the contact 1 current flows from the positive terminal of the battery 19 through the resistor R25, the brush and contact 1 of the fourth level, the rectifier D34, the resistor R35 and the base and emitter of the transistor T7 to the negative terminal of the battery. In turning on, the transistor assures discharge of the capacitor unit before the next charging operation thereof. As further assurance of full discharge of the capacitor unit CA4 contacts 1, 3, 5 and 7 of the seventh level of the stepping switch are connected to the right-hand terminal of the capacitor unit CA4 whereas the brush for this level is connected to the left-hand terminal of the capacitor unit as shown in FIG. 1C.

When the brush engages any of the contacts 2, 4 or 6 of the fourth level the capacitor unit CA4 starts to charge at a rate determined by the position of the plug PLA, PLB or PLC associated with the selected contact. When the voltage across the capacitor unit CA4 reaches a value sufficient to break down a minimum voltage device such as a Zener diode X14, current is supplied to the input circuit of a transistor T5 for the purpose of turning the transistor on through a circuit which may be traced from the right-hand terminal of the capacitor unit through the Zener diode Z14, the base and emitter of the transistor T5, a rectifier D23 and a resistor R26 to the left-hand terminal of the capacitor unit. A transient suppression capacitor C16 is connected across the resistor R26.

Inasmuch as the transistor T5 is now turned on, current flows from the positive terminal of the battery 19 through the resistor R25, a resistor R33, the collector and emitter of the transistor T5, the rectifier D23 and the resistor R26 to the negative terminal of the battery.

The resistor R26 is in the input circuit of a silicon-controlled rectifier SCR5 and the voltage across the resistor now is sufficient to turn on the controlled rectifier. Current is now supplied to a motor close relay MCR from the positive terminal of the battery 19 through the contacts SS1, the auxiliary switch 11S5 of the circuit breaker 11, the motor close relay MCR and the anode and cathode of the controlled rectifier SCR5 to the negative terminal of the battery 19. The motor close relay MCR closes its contacts MCR1 to complete with the auxiliary switch 11S6 of the circuit breaker 11 an energizing circuit for the closing motor 11C of the circuit breaker. This closing motor may be energized from any suitable source such as a 240 volt alternating-current source ACS. A rectifier D24 is connected across the motor close relay MCR in a conventional manner to discharge energy stored in the coil when the coil is deenergized.

If the circuit breaker 11 remains closed after any reclosure for a predetermined length of time, a reset timer operates to reset the stepping switch. In the reset position of the stepping switch, the brush and contact 10 of level 3 of the stepping switch completes with a resistor R44 and the contacts SS1 an energizing circuit for the base-emitter circuit of a transistor T9. This turns the transistor on to complete a discharge circuit for a capacitor unit CA3 of the reset timer.

The capacitor unit may comprise any number of capacitors. In the specific embodiment of FIG. 1C, four capacitors C17, C18, C19 and C20 are connected in parallel to constitute the unit CA3.

The upper terminals of five resistors R36, R37, R38, R39 and R40 are all connected to the lower terminal of the capacitor unit CA3. The lower terminals of the resistors are connected respectively to connection screw sockets of a tap block or conductive panel RE having a manually-operated plug PLE which may be inserted to connect any of the lower terminals of the resistors to the brush of level 1 of the stepping switch. The contacts 1 to 9 for this level are connected through the auxiliary switch 11S3, a resistor TH9 (which may have a negative temperature coefficient of resistance to compensate for changes with temperature of the voltage needed to fire the controlled rectifier SCR6) and a constant-voltage device such as a Zener diode Z13 to the negative terminal of the battery 19. It will be noted that the Zener diode Z13 is connected through the resistors TH9 and R25 across the battery. Consequently, the voltage across the Zener diode is substantially constant and forms a suitable source for energizing the reset timer.

The five resistors connected to the capacitor unit CA3 have resistance values selected to provide desired time delays for the reset timer. For example, the resistors R40, R39, R38, R37 and R36 may be selected to provide respectively delays of 10, 30, 60, 90 and 120 seconds.

After a tripping operation of the circuit breaker 11, the brush of level 3 of the stepping switch is displaced from the contact 10 and is no longer effective for establishing a discharge circuit for the capacitor unit CA3. However, as long as the circuit breaker remains tripped and the contacts SS1 are closed current is supplied from the positive battery terminal through the contacts SS1, the auxiliary switch 11S5, the rectifier 31, the resistor R44 and the base-emitter circuit of the transistor T9 to the negative battery terminal to turn on the transistor and thus to assure discharge of the capacitor unit CA3. Reclosure of the circuit breaker opens the auxiliary switch 11S5 to turn off the transistor T9 and thus to permit charging of the capacitor unit CA3. The reclosure of the circuit breaker additionally closes the auxiliary switch 11S3 to connect the capacitor unit CA3 across the Zener diode Z13 through the resistor selected by the plug PLE through level 1 of the stepping switch and through the resistor TH9.

The capacitor unit CA3 now charges at a rate determined by the selected resistor until the voltage becomes sufficient to break down a minimum voltage device such as a Zener diode Z15. The voltage across the capacitor unit CA3 directs a current through a circuit which may be traced from the lower terminal of the capacitor unit through the Zener diode Z15, the base and emitter of a transistor T8, a rectifier D25, a resistor R41 and the integrator coil SS to the upper terminal of the capacitor unit. The current flowing in this circuit is insufficient to operate the integrator coil SS. It is also insufficient to turn on a switching device such as a silicon-controlled rectifier SCR6 which has the resistor R41 in its input circuit. A transient suppression capacitor C21 is connected across the resistor R41.

Inasmuch as the transistor T8 is now turned on, current is supplied from the positive terminal of the battery 19 through the resistor R25, the resistor R42, the collector and emitter of the transistor T8, the rectifier D25, the resistor R41, and the integrator coil SS to the negative terminal of the battery 19. This current is insufficient to operate the integrator coil SS but is sufficient to fire the controlled rectifier SCR6.

Current now flows from the positive terminal of the battery 19 through the contacts SS1 of the stepping switch, homing contacts HC, the anode and cathode of the controlled rectifier SCR6 and the integrator coil SS to the negative terminal of the battery 19. The homing contacts HC are cam-operated by the stepping switch to open only when the switch is in the home or reset position. As the stepping switch steps to its next position, the contacts SS1 open to deenergize the integrator coil SS and thereafter reclose to reenergize the coil of the stepping switch for another stepping operation. As a result of this self-stepping operation, the stepping switch continues to step until it reaches position 10 wherein the homing contacts HC are open and the recloser control is completely reset for future tripping and reclosing operations.

It will be recalled that closure of the switches IL01 and IL02 (FIG. 1B) conditions the system for a prompt tripping operation. These switches are a part of a three-pole single-throw switch unit which includes a switch IL03 (FIG. 1C). When the switch unit is operated for lockout purposes, closure of the switch IL03 prepares an energizing circuit for the integrator coil SS which may be traced from the positive terminal of the battery 19 through the self-stepping contacts SS1, the auxiliary switch 11S5, a rectifier D29, the switch IL03, the brush and a contact (assumed to be contact 10) of level 2 of the stepping switch and the integrator coil SS to the negative terminal of the battery. Tripping of the circuit breaker closes the auxiliary switch 11S5 to complete a self-stepping circuit for the stepping switch which now steps to its number 8 or lockout position.

By inspection of FIG. 1B, it will be noted that the switch IL01 is arranged to be shunted by a selected position of level 6 of the stepping switch. The brush for level 6 of the stepping switch is connected to the left-hand terminal of the switch IL01. Each of the desired contacts of this level may be selectively connected to the right-hand terminal of the switch IL01 through operation of a plug PL1. To this end, the plate IL05 has an electroconductive connection to the right-hand terminal of the switch IL01 and has four sockets for reception of the plug PL1. These sockets have conductor segments connected respectively to the contacts 10, 2, 4 and 6 for level 6 of the stepping switch. Consequently, if the plug PL1 is in one of the sockets such as that corresponding to position 4 of the stepping switch and if the switch IL01 is open, when the stepping step reaches its fourth position, the brush for level 6 engages the contact 4 of level 6 to condition the circuit breaker for a prompt tripping operation. A similar shunting arrangement is provided for the switch IL02 as represented by a plate IL06 having four sockets for reception of a plug.

Remote control for tripping the circuit breaker is provided by a switch unit including a switch CST1 (FIG. 1B) and a switch CST2 (FIG. 1C). Closure of the switch CST1 connects the trip coil of the circuit breaker across the battery 19 through the auxiliary switch 11S1 to trip the circuit breaker. Closure of the switch CST2 connects the integrator coil SS through level 2 of the stepping switch and the self-stepping contacts SS1 across the battery 19 for the purpose of locking out the system in the manner previously described.

Closure of the circuit breaker can be initiated from a remote point by means of a single-pole, single-throw switch CSC (FIG. 1C). When the switch CSC is closed, it connects the resistor R26 across the regulated voltage appearing across the Zener diode 13 through a capacitor C15 and the resistor R25. The resultant pulse of current through the resistor R26 produces a voltage thereacross sufficient to fire the controlled rectifier SCR5 which now connects the motor close relay MCR across the battery 19 through the auxiliary switch 11S5. The relay closes its contacts MCR1 to establish a closing circuit for the closing motor 11C through the auxiliary switch 11S6 Inasmuch as only one pulse is produced for each closure of the switch CSC, repeated reclosures or pumping of the circuit breaker do not occur if the circuit breaker trips while the switch is held closed. When the switch CSC is opened, the capacitor C15 discharges through the resistors R26 and R27.

When the load supplied through the circuit breaker 11 has been deenergized for a substantial period of time, the closure of the circuit breaker may be accompanied by a substantial flow of current for a short period of time. The current which flows during this brief period may be substantially above the normal range of load current which flows through the circuit breaker after the load has been picked up for a substantial time period. To prevent a tripping operation of the circuit breaker under these conditions, a switch unit CLP (FIG. 1A) is provided. When closed, the switch CLP connects a resistor RCL across the resistors R2 and RH1 to lower the tripping sensitivity of the circuit breaker to line currents. During this period, the sensitivity of the system may still be sufficient to assure a tripping operation in response to an extremely large fault current. After the lapse of a time sufficient to assure proper pickup of the load, the switch CLP may be opened to restore full sensitivity to the system. For similar reasons a switch CLP1 may be connected across the secondary winding of the transformer CTG.

Preferably the battery 19 is rechargeable and is included as a self-contained part of the control unit. Desirably, a battery charger BC also is included as part of the control unit for the purpose of maintaining the battery in a charged condition in a manner well understood in the art.

The condition of the circuit breaker may be shown in a conventional manner by a red lamp RL and a green lamp GL. The auxiliary switches 11S2A and 11S2B connect the red lamp or the green lamp through a resistor RL1 across the source ACS dependent on whether the circuit breaker is closed or open. Conveniently the switches CST2, CST1, CSC and CLP are ganged for operation by a single three-position handle HTC (FIG. 3). In the "center" position of the handle all of the switches are open. In the "close" position of the handle switches CSC and CLP are closed. In the "trip" position of the handle switches CST2 and CST1 are closed.

From the preceding discussion, it is clear that the system of FIG. 1 provides extremely reliable and flexible operation of a circuit breaker. The overall operation of the system may be summarized as follows.

For a manual closing operation, the switches CLP and CLP1 are closed to desensitize the tripping control of the circuit breaker. In addition the switch CSC is closed for the purpose of energizing the motor close relay MCR which initiates a closing operation of the circuit breaker 11. After expiration of a period of time sufficient to assure subsidence of load currents below cold or pickup values, the switches CLP, CLP1 and CSC are opened. The opening of the switches CLP and CLP1 restores full sensitivity to the system.

If a fault occurs resulting in the flow of line currents of excessive fault magnitudes, the capacitor unit CA1 is charged to a value sufficient to initiate a tripping operation of the circuit breaker 11. One of many inverse-time-delay-characteristic curves may be selected by operation of the curve-selector 27 and of the adjustable resistor RH3.

In an analogous manner if a fault occurs resulting in the flow of substantial zero-sequence current, the capacitor unit CA2 charges to a value sufficient to trip the circuit breaker 11.

If the plug PLG is inserted in a socket in the plate IL05 which corresponds to the position of the stepping switch, a relatively prompt tripping operation of the circuit breaker is obtained in response to line current. In an analogous manner, a plug inserted in a socket of the plate IL06 which corresponds to the position of the stepping switch is effective to produce a relatively prompt tripping of the circuit breaker in response to zero-sequence current.

Each tripping operation of the circuit breaker advances the stepping switch.

Following each tripping operation of the circuit breaker 11, provided that no lockout occurs, a time delay in reclosing is measured by the charging of the capacitor unit CA4 which is charged at a rate dependent on the position of the stepping switch and the positions of the plugs PLA, PLB and PLC. Upon the expiration of the time delay determined by the charging of the capacitor unit CA4, the circuit breaker is reclosed. If the fault persists, the circuit breaker again trips and advances the stepping switch. A new reclosing time delay is measured by the charging of the capacitor unit CA4, provided that no lockout occurs, and on the expiration of this time delay the circuit breaker is again reclosed. The tripping and reclosing of the circuit breaker continue until lockout of the breaker occurs, or until the circuit breaker remains closed for a predetermined time.

Upon each reclosure of the circuit breaker 11, a reset time delay is measured by the charging of a capacitor unit CA3 at a manually-selected rate. The reset timer is reset for each operation of the circuit breaker. Consequently the whole time delay selected for the reset timer is available for each reclosure of the circuit breaker. If the circuit breaker remains reclosed for a time sufficient to permit expiration of the reset time delay, the charge in the capacitor unit CA3 reaches a value sufficient to initiate energization of the integrator coil to reset the stepping switch to its position 10.

If it is desired to limit the operations of the circuit breaker to a predetermined number prior to lockout, the appropriate number of operations may be selected by proper location of the plug PL in one of the sockets in the plate OL. If the circuit breaker fails to remain closed for the time required for operation of the reset timer prior to arrival of the stepping switch at the position selected by the plug PL, the stepping switch steps to its lockout position.

With the control in its lockout position, the light LL is illuminated to indicate that the control is in such lockout position.

If prompt tripping and lockout are desired for the circuit breaker, the switch unit including the switches IL03, IL02 and IL03 is operated to closed condition. If the circuit breaker is closed at the time of such operation, it is conditioned to trip promptly in response to either line or zero-sequence current. In addition, the stepping switch is stepped to its lockout position.

If manual or remote control of the circuit breaker is desired, the switch HTC is operated in the close direction to initiate a closing operation of the circuit breaker. The switch HTC is operated to trip condition for the purpose of tripping the circuit breaker. Such operation also results in stepping of the stepping switch to its lockout position.

If the circuit breaker 11 is in its lockout position at the time the switch HTC is operated in the close direction, the circuit breaker recloses. This reclosure is accompanied by reclosure of the auxiliary switch 11S3 to initiate a timing operation of the reset timer. If the circuit breaker remains closed for the time for which a reset timer is set, the capacitor unit CA3 charges to a value sufficient to initiate the firing of the controlled rectifier SCR6 and this resets the stepping switch to its position 10.

FIG. 3 shows a suitable arrangement of the various controls on a panel. A number of jacks J1, J2, J3, J4 and JC are provided to facilitate the testing of various voltages appearing in the system.

Although the application has been described with reference to certain specific embodiments thereof, numerous modifications falling within the spirit and scope of the invention are possible.

We claim as our invention:

1. In a circuit-controlling system, a circuit breaker, electro-responsive tripping means for tripping the circuit breaker, electro-responsive closing means for closing the circuit breaker, reclose control means responsive to tripping operations of the circuit breaker for operating the closing means in a pattern of reclosures to reclose the circuit breaker after each of a plurality of tripping operations of the circuit breaker, timing means having a ready condition and a timing interval condition for timing a predetermined time, said timing means being actuated into its said timing condition as a consequence of an actuation of said reclose control means and actuated into said ready condition as a consequence of an actuation of said tripping means, and reset means actuated as a consequence of the timing out of said timing means to condition said reclose control means to repeat said pattern of reclosures whereby said reset means is effective to condition said reclose control means a predetermined time after each of said reclosing operations in which the circuit breaker remains closed for said predetermined time.

2. In a circuit-controlling system, a circuit breaker, electro-responsive tripping means for tripping the circuit breaker, electro-responsive closing means for closing the circuit breaker, reclose control means responsive to tripping operations of the circuit breaker for operating the closing means in a pattern of reclosures to reclose the circuit breaker after each of a plurality of tripping operations of the circuit breaker, said control means including means for introducing a time delay between tripping and closure for one of said pattern of reclosures which differs from that for another of said pattern of reclosures, and reset means effective a predetermined time after each of said reclosing operations during which the circuit breaker remains closed for conditioning the reclose control means to repeat said pattern of reclosures, said reset means comprising storage means for storing an electric quantity, a plurality of channels each effective for establishing a separate rate of supply of an electric quantity to said storage means, selective means manually-operable for selecting each of said channels, and means responsive to storage of a predetermined amount of an electric quantity in said storage means for conditioning the reclose control means to repeat said pattern of reclosures.

3. In a circuit controlling system, a circuit breaker, electro-responsive tripping means for tripping the circuit breaker, electro-responsive closing means for closing the circuit breaker, reclose control means responsive to tripping operations of the circuit breaker for operating the closing means in a pattern of reclosures to reclose the circuit breaker after each of a plurality of tripping operations of the circuit breaker, said control means including means for introducing a time delay between tripping and closure for one of said pattern of reclosures which differs from that for another of said pattern of reclosures, and reset means effective a predetermined time after each of said reclosing operations during which the circuit breaker remains closed for conditioning the reclosure control means to repeat said pattern of reclosures, said reset means comprising storage means for storing an electric quantity, a plurality of channels each effective for establishing a separate rate of supply of an electric quantity to said storage means, selective means manually-operable for selecting each of said channels, and means responsive to storage of a predetermined amount of an electric quantity in said storage means for conditioning the reclose control means to repeat said pattern of reclosures, and means responsive to an operation of said circuit breaker for discharging said storage means.

4. In a circuit controlling system, a circuit breaker, electro-responsive tripping means for tripping the circuit breaker, electro-responsive closing means for closing the circuit breaker, reclose control means responsive to tripping operations of the circuit breaker for operating the closing means in a pattern of reclosures to reclose the circuit breaker after each of a plurality of tripping operations of the circuit breaker, said control means including means for introducing a time delay between tripping and closure for one of said pattern of reclosures which differs from that for another of said pattern of reclosures, and reset means effective a predetermined time after each of said reclosing operations during which the circuit breaker remains closed for conditioning the reclose control means to repeat said pattern of reclosures, said reset means comprising storage means for storing an electric quantity, a plurality of channels each effective for establishing a separate rate of supply of an electric quantity to said storage means, selective means manually-operable for selecting a desired one of said channels, manually-operable means for determining the number of reclosures in said pattern, and means responsive to storage of a predetermined amount of an electric quantity in said storage means for conditioning the reclose control means to repeat said pattern of reclosures.

5. In a circuit controlling system, a circuit breaker, electro-responsive tripping means for tripping the circuit breaker, electro-responsive closing means for closing the circuit breaker, reclose control means responsive to tripping operations of the circuit breaker for operating the closing means in a pattern of reclosures to reclose the circuit breaker after each of a plurality of tripping operations of the circuit breaker, said control means including means for introducing a time delay between tripping and closure for one of said pattern of reclosures which differs from that for another of said pattern of reclosures, and reset means effective a predetermined time after each of said reclosing operations during which the circuit breaker remains closed for conditioning the reclose control means to repeat said pattern of reclosures, said reclose control means including storage means for storing an electric quantity, actuating means responsive to a predetermined storage of the electrical quantity in the storage means for operating the closing means, and a plurality of control units each effective for establishing a different time of storage of the electric quantity in the storage means in an amount sufficient to operate said actuating means.

6. In a circuit controlling system, a circuit breaker, electro-responsive tripping means for tripping the circuit breaker, electro-responsive closing means for closing the circuit breaker, reclose control means responsive to tripping operations of the circuit breaker for operating the closing means in a pattern of reclosures to reclose the circuit breaker after each of a plurality of tripping operations of the circuit breaker, said control means including means for introducing a time delay between tripping and closure for one of said pattern of reclosures which differs from that for another of said pattern of reclosures, and reset means effective a predetermined time after each of said reclosing operations during which the circuit breaker remains closed for conditioning the reclose control means to repeat said pattern of reclosures, said reclose control means including storage means for storing an electric quantity, actuating means responsive to a predetermined storage of the electrical quantity in the storage means for operating the closing means, and discharge means responsive to a reclosure of said circuit breaker for discharging the storage means, said discharge means being ineffective to discharge the storage means when the circuit breaker is in tripped condition.

7. In a circuit controlling system, storage means for storing an electric quantity, a pair of control devices each having an input circuit and an output circuit having a conductivity determined by the condition of the input circuit, means connecting said output circuits in a series circuit across the storage means to discharge the storage means and independently-controlled means connected to the input circuit for each of the control devices to maintain the output circuits in conductive condition, each of said independently-controlled means being independently operable to place the associated output circuit in non-conductive condition whereby the storage means is conditioned to store an electric quantity.

8. In a circuit controlling system, storage means for storing an electric quantity, a pair of control devices each having an input circuit and an output circuit having a conductivity determined by the condition of the input circuit, means connecting said output circuits in a series circuit across the storage means to discharge the storage means, and independently controlled means connected to the input circuit for each of the control devices to maintain the output circuits in conductive condition, each of said independently controlled means being independently operable to place the associated output circuit in non-conductive condition, whereby the storage means is conditioned to store an electric quantity, a pair of current-responsive means each associated with a separate one of the control devices and each independently effective in response to a separate current above a predetermined magnitude for supplying an electric quantity to be stored in said storage means, and means responsive to the conditioning of each of said current responsive means to supply an electric quantity to be stored in the storage means for supplying an input to the associated one of said control devices to interrupt the series circuit.

9. In a circuit controlling system, storage means for storing an electric quantity, a pair of transistors each having an input circuit and an output circuit having a conductivity determined by the condition of the input circuit, means connecting said output circuits in a series circuit across the storage means to discharge the storage means, and independently-controlled means connected to the input circuit for each of the transistors to maintain the output circuits in conductive condition, each of said independently-controlled means being independently operable to place the associated output circuit in non-conductive condition, whereby the storage means is conditioned to store an electric quantity, a pair of current-responsive means each associated with a separate one of the control devices and each independently effective in response to a separate current above a predetermined magnitude for supplying an electric quantity to be stored in said storage means, and means responsive to the conditioning of each of said current-responsive means to supply an electric quantity to be stored in the storage means for supplying an input to the associated one of said transistors to interrupt the series circuit.

10. In a circuit controlling system, a circuit breaker, electro-responsive tripping means for the circuit breaker, electro-responsive closing means for the circuit breaker, means operable for energizing said closing means for reclosing the circuit breaker following each of a plural number of tripping operations of the circuit breaker from a predetermined circuit-breaker-closed condition, an electric switch having a first and a second position, and switch means responsive to operation of said switch for operating said closing means to close the circuit breaker, a source of direct current, a capacitor, circuit means connecting said capacitor to said source through said switch whereby current flows to charge said capacitor in response to the movement of the switch to said first position, said circuit means being effective to discharge said capacitor in response to the movement of said switch to said second position and to maintain said capacitor in the one of its said charged conditions to which it is actuated as a consequence of the positioning of said switch into one of its said positions as long as said switch is maintained in its said one position, and means responsive to said current flow through the capacitor in response to the movement of said switch to its said one position for initiating an operation of said closing means.

11. In a switch reclosure control having static components for a polyphase electrical system, terminal means effective when energized from a polyphase electrical system for providing quantities dependent on system line and zero-sequence currents, first static means for deriving from said system a first direct voltage dependent on a time function of at least one substantial line current in said system, second static means for deriving from said system a second direct voltage dependent on a time function of a substantial zero-sequence current in said system, tripping output terminals for delivering a switch-tripping output, closing output terminals for delivering a switch closing output, third static means for delivering to said tripping output terminals a switch-tripping voltage in response to presence of said first direct voltage, said third static means being responsive to presence of said second direct voltage for delivering to the tripping output terminals a switch-tripping output, fourth static means effective following delivery of a switch-tripping output to said tripping output terminals for delivering a time-delayed switch-closing-output to the closing output terminals, and means responsive to delivery of a switch-tripping output following delivery of said last-named switch-closing output for altering the parameters of said fourth static means to change the time delay of said fourth static means.

12. A control as set forth in claim 11 in combination with a switch controlled by said switch-tripping and switch-closing outputs, static resetting means responsive to failure of production of said switch-tripping output within a predetermined time after a closure of said switch for producing a resetting direct voltage, and means responsive to said resetting direct voltage for resetting the control to a predetermined condition.

13. A control as set forth in claim 11 in combination with a circuit-breaker switch, means operating the circuit-breaker switch to tripped and closed conditions dependent respectively on said switch-tripping and switch-closing outputs, a stepping switch having a plurality of positions and means responsive to predetermined operations of said circuit-breaker switch for successively stepping the stepping switch, and means responsive to each stepping of said stepping switch from one to another of said positions for altering the time delay of said fourth static means.

14. A control as set forth in claim 11 in combination with static resetting means for producing a resetting direct voltage a predetermined time after each reclosure.

15. In a switch reclosure control having static components for a polyphase electrical system, terminal means effective when energized from a polyphase electrical system for providing quantities dependent on system line and zero-sequence currents, first static means for deriving from said system a first direct voltage dependent on a time function of at least one substantial line current in said system, tripping output terminals for delivering a switch-tripping output, closing output terminals for delivering a switch-closing output, third static means for delivering to said tripping output terminals a switch-tripping voltage in response to presence of said first direct voltage, fourth static means effective when initiated for delivering a time-delayed switch-closing output to the closing output terminals, a circuit-breaker switch, means operating the circuit-breaker switch to tripped and closed conditions dependent respectively on said switch-tripping and switch-closing outputs, a stepping switch having a plurality of positions, means responsive to predetermined operations of said circuit-breaker switch for successively stepping the stepping switch, means responsive to the stepping of said stepping switch from one to another of said positions for altering the time delay of said fourth static means, means responsive to a tripping of the circuit-breaker switch for initiating operation of said fourth static means to produce a switch-closing output, a manually-operable connector, and lockout means having a plurality of lockout circuits each completed by a separate position of the stepping switch and the manually-operable connector, said lockout means being responsive to completion of any of said lockout circuits for locking said stepping switch in a predetermined condition.

16. In a control as set forth in claim 15, an auxiliary lockout circuit comprising a manually-operable switch, and means responsive to opening of the circuit-breaker switch and a predetermined condition of the manually-operable switch for blocking reclosure of the circuit-breaker switch.

17. A control as set forth in claim 11 in combination with a circuit-breaker switch, means operating the circuit-breaker switch to tripped and closed conditions dependent respectively on said switch-tripping and switch-closing outputs, a stepping switch having a plurality of positions and means responsive to predetermined operation of said circuit-breaker switch for successively stepping the stepping switch, and trip-modifying means comprising a manually-operable switch, said trip-modifying means being responsive to a predetermined position of said stepping switch and to a predetermined condition of said manually-operable switch for modifying the parameters for producing said switch-tripping output.

References Cited

UNITED STATES PATENTS

| | | | |
|---|---|---|---|
| 2,040,425 | 5/1936 | Biach | 317—22 |
| 2,957,109 | 10/1960 | White et al. | 317—41 |
| 3,100,854 | 8/1963 | Riebs | 317—22 |

FOREIGN PATENTS 1,101,653  4/1955  France.

OTHER REFERENCES

Temperature Controlled Static Switching, Solid State Products, Inc. (SSP1), 1961, 307—88.5–23.2.

JOHN F. COUCH, *Primary Examiner.*

J. D. TRAMMELL, *Assistant Examiner.*

U.S. Cl. X.R.

317—33, 36